May 10, 1927.
Re. 16,623
W. WOOD
OIL BURNER
Original Filed Feb. 1, 1922 2 Sheets-Sheet 1
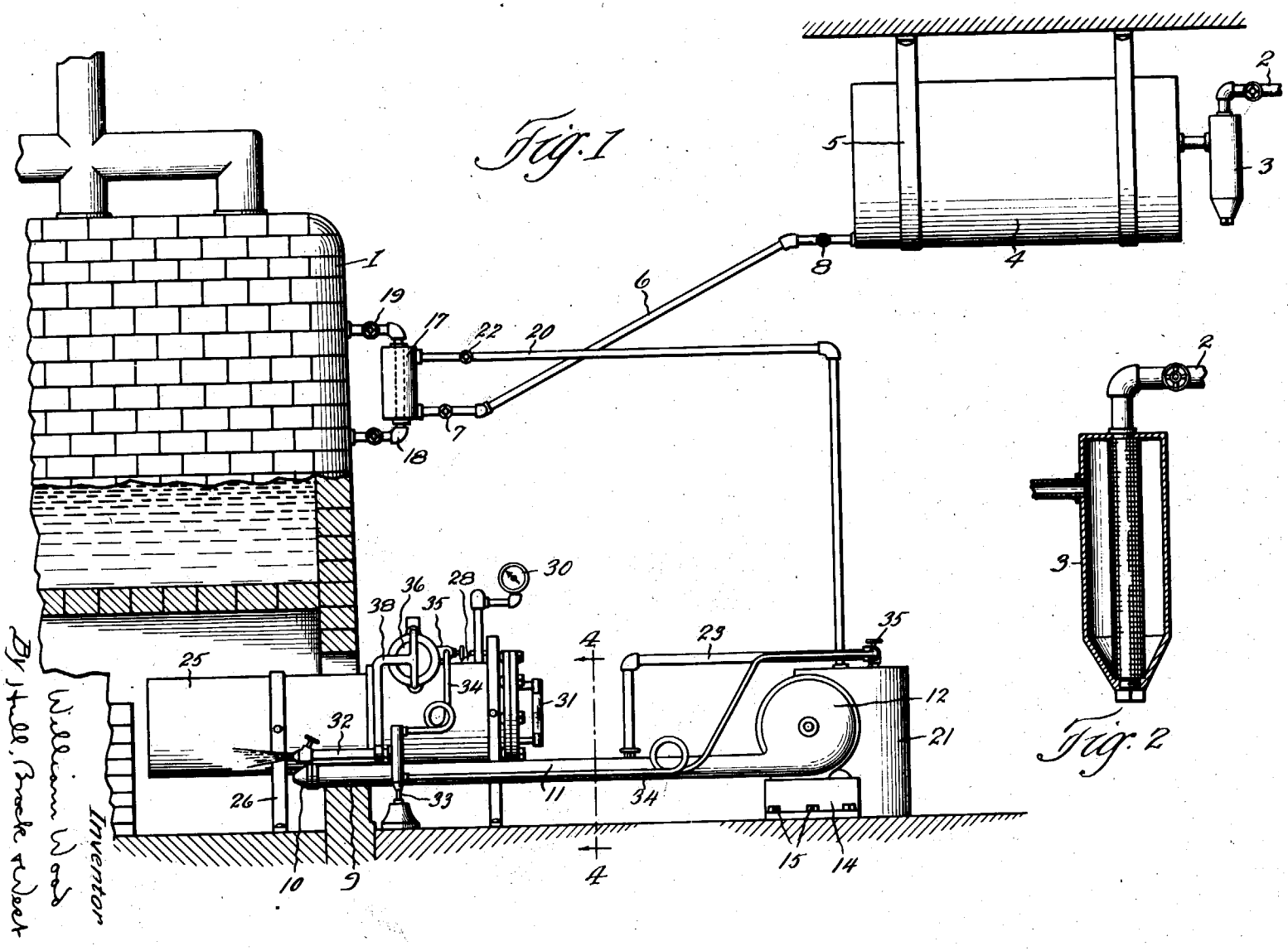

May 10, 1927. Re. 16,623

W. WOOD

OIL BURNER

Original Filed Feb. 1, 1922 2 Sheets-Sheet 2

Inventor
William Wood
By Hull, Brock & West
Attys.

Reissued May 10, 1927. Re. 16,623

UNITED STATES PATENT OFFICE.

WILLIAM WOOD, OF GLENROCK, WYOMING, ASSIGNOR TO PERFECTION STOVE COMPANY, OF CLEVELAND, OHIO, A CORPORATION OF OHIO.

OIL BURNER.

Original No. 1,431,074, dated October 3, 1922, Serial No. 533,446, filed February 1, 1922. Application for reissue filed May 15, 1925. Serial No. 30,625.

This invention relates to improvements in liquid fuel burners, having for an object to provide an oil and steam burner of the atomizer type, wherein the fuel oil will be preheated and then delivered to the burner means for admixture with that amount of steam necessary for converting the same into a readily combustible material, the full mixture then being discharged for burning from the burner means in an atomized body.

It is likewise an object of the invention to provide an oil burner employing means in form of a secondary burner for generating that steam initially supplied to the main burner, such main burner being automatically adjustable in order that when sufficient steam has been generated, the application of heat to the retort will be accordingly diminished or reduced and vice versa when the supply of steam needs to be replenished.

Other objects will be in part obvious and in part pointed out hereinafter.

In order that the invention and its mode of operation may be readily understood by persons skilled in the art, I have in the accompanying illustrative drawings and in the detailed following description based thereon set out one possible embodiment of the same.

Figure 3:
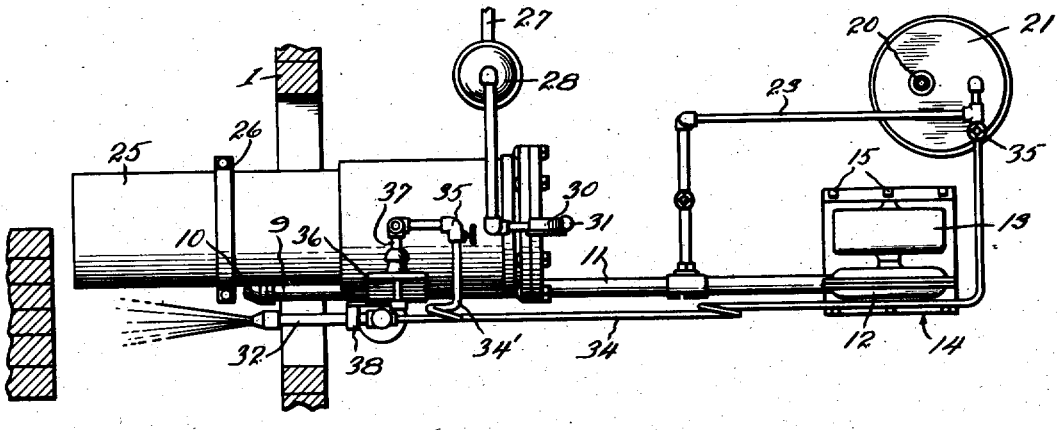
Figure 4:
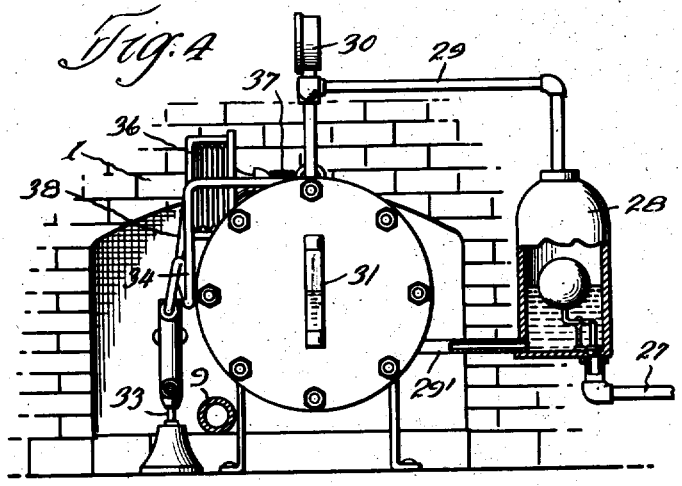
Figure 5:
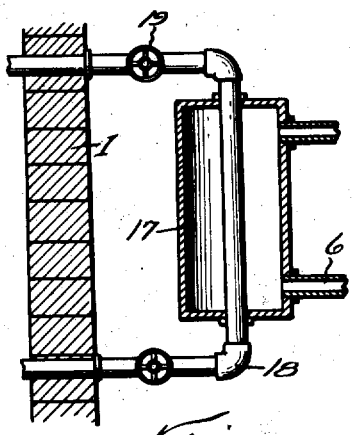
Figure 6:
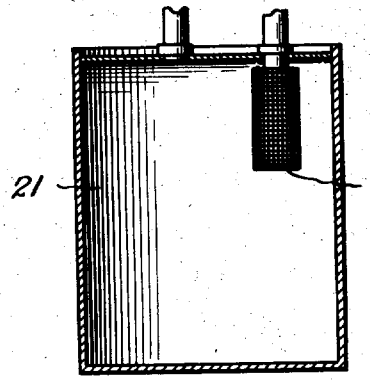

In these drawings Fig. 1 is a side elevation of the improved burner; Fig. 2 is a vertical section through the form of oil strainer employed; Fig. 3 is a top plan view of the burner; Fig. 4 is a vertical transverse section taken on the line 4—4 of Fig. 1 looking in the direction in which the arrows point; Fig. 5 is a detail in vertical section showing the means for preheating the oil supplied to the burner; and Fig. 6 is a detail in vertical section showing the type of oil filter employed in connection with the burner.

Having more particular reference to the drawings, in connection with which like characters of reference will designate corresponding parts throughout, the improved burner may be stated for the purposes of illustration, to be designed for use in connection with that type of boiler fragmentally shown in the Fig. 1 and indicated in its entirety by the numeral 1; a fuel feeding pipe 2 communicating, through an oil filter 3 with an oil supply tank 4 supported upon suitable brackets 5 at a point in proximity to but elevated in respect to the boiler 1 and having an oil supply conduit 6 extending therefrom controlled by suitable types of hand valves 7 and 8.

A starting or secondary burner 9 extends through an opening in the front wall of the boiler 1, having a burner cap 10 thereon of suitable design, whereby the oil will be caused to thoroughly mix with a supply of air also delivered to the burner, in a manner which will be presently described, said burner 9 being arranged upon the outer end of a conduit 11 extending from and supported by the casing of a rotary blower 12 supplied with suitable motive means generally indicated at 13, the same, as shown in the Figs. 1 and 3, being arranged upon a base 14 which in turn, is adapted to be fixedly connected to the particular support therefor, through the medium of bolts 15.

Fuel for the starting or secondary burner 9 is delivered to the same from a cylindrical heater 17 arranged upon a conduit 18 tapped from the boiler 1, whereby the heated water therein may flow through the same, such flow of water being regulated by means of hand valves 19. The free end of the conduit 6 as shown in the Fig. 1 extends into engagement with the lower portion of the tank heater 17, embracing the vertical portion of the conduit 18, while an outlet conduit 20 extends from the upper end of said heater and into engagement with the upper end of an oil filtering tank 21; a hand valve 22 being preferably interposed in said outlet conduit 20 for an obvious purpose. Extending for a distance into the top of the tank filter 21 is a branch conduit 23 having a suitable strainer 24 arranged about the inner end portion of the same, as shown in the Fig. 6, while the opposite end thereof is suitably tapped into engagement with the intermediate portion of the conduit 11 extending from the rotary blower 12, thus permitting the delivery of oil to said conduit 11 from whence it will be blown forwardly through the conduit by reason of the air pressure therein and thus broken up into fine combustible particles for admixture with the proper quantity of air, hereinafter more fully described.

As will be noted, the arrangement of the burner 9 is such as to direct the flame emitted therefrom into engagement with a cylindrical retort 25, supported as at 26 at a position in proximity to said burner and extending through the opening in the forward wall of the boiler 1, into the combustion chamber thereof, as clearly shown in the Fig. 1. By reason of the engagement of the flame emitted from the burner 9 with the lower side of the retort 25, the water contained within the same will be rapidly converted into steam, such water within the retort being supplied thereto from a suitable feed pipe 27 communicating with the lower end of the float valve controlled regulating tank 28 having an outlet conduit 29ª connected to the lower end thereof and communicating with said retort, while a steam inlet conduit 29 is tapped into the reduced upper end of said tank, as shown in the Fig. 4, this latter conduit 29 extending into engagement with a pressure gage 30 which is supported thereon for an obvious purpose. Also, a sight gage 31 may be and preferably is arranged adjacent to the outer end wall of the cylindrical retort 25 and as will be understood, communicates at its opposite ends with the same in order that the water level within the retort 25 may be readily ascertained by an operator.

A main burner 32 is provided and is arranged at a point adjacent the lower side of the inner portion of the cylindrical retort 25, being disposed so as to direct the heating flame emitted therefrom onto a portion of the retort 25 within the combustion chamber of the furnace housing, whereby to permit the constant generation of steam within said retort irrespective of whether the starting or secondary burner 9 is emitting flame or not. This main burner 32 is pivotally mounted for horizontal movement upon a bracket or pedestal 33 arranged at a point directly adjacent the outer side of the forward wall of the boiler 1 and communicates with a branch fuel feeding pipe 34 extending from the oil filtering tank 21, the same being preferably controlled by a suitable valve 35 in order that the flow of fuel to the furnace may be regulated as desired.

Steam from the cylindrical retort 25 is supplied to the main burner 32 by way of a conduit 34′ communicating at one end with the upper portion of the retort and at its remaining end with the rearward portion of the main burner as shown in the Fig. 1; a valve 35′ being preferably interposed in said conduit 34′ for an obvious purpose.

As means for automatically controlling the amount of steam generated in the retort 25 by engagement of the heating flame emitted from the main burner 32 therewith, subsequent to the extinguishing of the heating flame emitted from the starting burner 9, I provide a pressure controlled diaphragm 36, one end of which is connected through a conduit 37 to the upper portion of the retort 25, in proximity to the connection of the conduit 34′ therewith, while the opposite or movable end of said diaphragm is connected through a bracket arm 38 to the rearward portion of the pivoted and horizontally movable main burner 32. Thus, it will be understood that when the pressure of steam within the retort 25 exceeds maximum, a portion of the same will enter the diaphragm by way of the conduit 37, expand the same and impart a lateral thrust to the bracket arm by way of the free and movable outer end thereof, hence, swinging the main burner 32 outwardly and away from the retort for a distance sufficient to either discontinue the application of heat to the retort 25 or to accordingly diminish the same to meet with the requisites then present.

The operation of the burner may be reviewed as follows:

To start the improved burner, oil is admitted by way of the conduit 23 to the conduit 11 whereupon it will be mixed with an amount of air sufficient to create a combustible mixture, whereupon the heated fuel will be broken into small particles and discharged for ignition from the burner cap 10 of the starting burner 9. Because of the fact that said burner 9 is positioned adjacent the inner and lower side of the retort 25, the flame emitted therefrom will be directed into engagement with said retort and hence a portion of the water therein will be converted into steam. At this time, the valve 35 of the conduit 34 is opened, admitting heated oil to the same for delivery to the main burner 32. At the same time, the valve 35′ in the conduit 34′ is opened, permitting the steam generated in the retort 25 to flow through the same into the main burner 32 for admixture with the heated fluid fuel flowing into the same. The pressure of the steam introduced into the main burner 32 will be sufficient to thoroughly break up the fluid or liquid fuel and cause its discharge in an atomized and highly combustible state therefrom, whereupon the same is ignited. With generation of an initial quantity of steam in the retort 25, the supply of fuel to the starting burner 9 may be discontinued, thus extinguishing its heating flame. Because of the positioning of the main burner 32 with relation to the retort 25, a portion of the heating flame emitted therefrom will be directed onto an adjacent portion of the retort 25 and hence, will carry on the generation of steam therein sufficient to continue to supply that quantity of steam to the main burner 32 for creating a highly combustible mixture. Should an excessive amount of steam be generated in the retort 25, a portion of the same will enter the expansible diaphragm 36, which in turn will be expanded and thus impart an outward lateral thrust to the arm 38 connected to the pivoted horizontally movable main burner 32, thereby moving the free end of said burner outwardly away from the retort 25 so as to diminish or entirely discontinue the application of the heating flame to the retort 25, thus enabling the apparatus to maintain an even pressure in order that efficient operation may continue.

The supply of water to the retort 25, as hereinbefore stated, will be automatically controlled by means of the float valve regulating tank 28, so that when the level of water in the regulating tank falls below normal, the float of the valve will accordingly drop and thus move the valve to its open position for admitting an additional supply of water by way of the feed pipe 27 from whence it will be delivered through the conduit 29′ to the retort.

Manifestly, the construction shown is capable of considerable modification and such modification as is within the scope of my claims, I consider within the spirit of my invention.

Having thus described my invention, what I claim is:

1. An oil burner comprising fuel feeding means, a main burner, a retort for supplying steam to the main burner for mixture with the fuel flowing therein, a secondary burner communicating with the fuel feeding means, and means connected to said main burner for automatically varying the proportion of the heat of the main burner flame which is applied to the retort.

2. An oil burner comprising fuel feeding means, a main burner, communicating with said fuel feeding means, a retort for supplying steam to the main burner for the mixture with the oil flowing therein, a secondary burner communicating with the fuel feeding means, and pressure operated means connected to said main burner for automatically varying its position with respect to said retort.

3. An oil burner comprising fuel feeding means, a main burner and a secondary burner communicating with said fuel feeding means, a retort for supplying steam to the main burner, a blower for supplying air to the secondary burner, and a pressure operated diaphragm connected to and communicating with the retort and adapted, upon expansion, to impart horizontal movement to the main burner for varying its position with relation to the retort.

4. An oil burner comprising fuel feeding means, a main burner communicating with said fuel feeding means, a retort connected to the main burner for supplying steam to the same, means connected to said main burner for automatically varying the intensity of heat applied to the retort therefrom, and a secondary burner communicating with the fuel feeding means for initially heating the retort.

5. In combination with a boiler, an oil burner comprising fuel feeding means, an oil heating tank arranged in proximity to and heated by said boiler communicating with the fuel feeding means, a retort, a main burner pivotally mounted for horizontal movement in proximity to one portion of said retort and communicating with said fuel feeding means beyond the heater, pressure operated means communicating with said retort and connected to said main burner for automatically adjusting its position with relation to said retort, and a secondary burner positioned in proximity to a portion of the retort, and communicating with said fuel feeding means beyond the heating means.

6. In combination with a boiler, an oil burner comprising fuel feeding means, a heater supported in proximity to and heated by said boiler communicating with said fuel feeding means, a main burner extending through the forward wall of the burner into the combustion chamber thereof communicating with said heater, a retort communicating with said main burner for supplying steam thereto, said main burner being arranged in proximity to and horizontally movable with relation to said retort, a pressure operated diaphragm connected to the retort and said main burner for automatically regulating the positioning of the latter with relation to the former, a secondary burner positioned in proximity to said retort communicating with said heater, and means for supplying air to said secondary burner.

In testimony whereof I hereunto affix my signature.

WILLIAM WOOD.